(12) United States Patent
Liu et al.

(10) Patent No.: US 10,187,546 B2
(45) Date of Patent: Jan. 22, 2019

(54) METHOD AND DEVICE FOR CORRECTING DOCUMENT IMAGE CAPTURED BY IMAGE PICK-UP DEVICE

(71) Applicant: FUJITSU LIMITED, Kawasaki-shi, Kanagawa (JP)

(72) Inventors: Wei Liu, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 15/410,040

(22) Filed: Jan. 19, 2017

(65) Prior Publication Data
US 2017/0208207 A1 Jul. 20, 2017

(30) Foreign Application Priority Data
Jan. 20, 2016 (CN) .......................... 2016 1 0037593

(51) Int. Cl.
| | |
|---|---|
| *H04N 1/387* | (2006.01) |
| *G06K 9/46* | (2006.01) |
| *H04N 1/393* | (2006.01) |
| *G06K 9/00* | (2006.01) |
| *G06K 9/32* | (2006.01) |
| *G06K 9/36* | (2006.01) |

(52) U.S. Cl.
CPC ....... *H04N 1/3872* (2013.01); *G06K 9/00442* (2013.01); *G06K 9/32* (2013.01); *G06K 9/3275* (2013.01); *G06K 9/4604* (2013.01); *G06K 9/4638* (2013.01); *H04N 1/3878* (2013.01); *H04N 1/3935* (2013.01); *G06K 2009/363* (2013.01)

(58) Field of Classification Search
CPC .... H04N 1/3872; G06K 9/00442; G06K 9/32; G06K 9/3275
See application file for complete search history.

(56) References Cited

U.S. PATENT DOCUMENTS

| | | | | |
|---|---|---|---|---|
| 5,491,759 | A * | 2/1996 | Nagao ................. | G06K 9/3283 382/197 |
| 8,170,368 | B2 * | 5/2012 | Yin ...................... | G06K 9/3283 382/113 |
| 8,645,119 | B2 * | 2/2014 | Och .................... | G06F 17/2845 704/2 |

(Continued)

*Primary Examiner* — Gregory M Desire
(74) *Attorney, Agent, or Firm* — Staas & Halsey LLP

(57) ABSTRACT

The present application relates to a method and a device for correcting a document image captured by an image pick-up device. The method includes: determining world coordinates of four vertices of the document image; calculating an original aspect ratio of the document image based on a correspondence between the world coordinates of the four vertices and projective coordinates of the four vertices in a projective space, and an intrinsic matrix and characteristics of an extrinsic matrix of the image pick-up device; determining a projective transformation matrix based on the world coordinates of the four vertices and the aspect ratio; and obtaining a corrected document image based on the determined projective transformation matrix and the document image. According to the application, perspective transformation can be corrected by using only one captured image and an original image can be recovered based on an original aspect ratio.

20 Claims, 7 Drawing Sheets

(56) References Cited

U.S. PATENT DOCUMENTS

| | | | | |
|---|---|---|---|---|
| 8,855,375 B2* | 10/2014 | Macciola | ............... | H04N 1/387 |
| | | | | 382/112 |
| 9,122,921 B2* | 9/2015 | Beato | ................. | G06K 9/00463 |
| 9,456,123 B2* | 9/2016 | Emmett | ............. | H04N 5/23212 |
| 9,524,445 B2* | 12/2016 | Campbell | ................ | G06K 9/00 |
| 9,747,499 B2* | 8/2017 | Kim | ................... | G06K 9/00442 |
| 2010/0310132 A1* | 12/2010 | Perez Gonzalez | ... | G06K 9/4642 |
| | | | | 382/112 |
| 2013/0343609 A1* | 12/2013 | Wilson | ............... | G06K 9/00463 |
| | | | | 382/103 |
| 2015/0116201 A1* | 4/2015 | Tsou | ....................... | G06F 3/013 |
| | | | | 345/156 |
| 2017/0208207 A1* | 7/2017 | Liu | ................... | G06K 9/00442 |

\* cited by examiner

METHOD AND DEVICE FOR CORRECTING DOCUMENT IMAGE CAPTURED BY IMAGE PICK-UP DEVICE

CROSS-REFERENCE TO RELATED APPLICATIONS

This application claims the priority benefit of Chinese Patent Application No. 201610037593.8, filed on Jan. 20, 2016 in the Chinese State Intellectual Property Office, the disclosure of which is incorporated herein in its entirety by reference.

BACKGROUND

1. Field

The disclosure relates to the field of image processing, and in particular to a method and a device for correcting a document image captured by an image pick-up device.

2. Description of the Related Art

Recently, an image pick-up device has become a very common device. The image pick-up device may be integrated into a mobile phone, a personal computer and a tablet computer. People often capture a large amount of paper documents by using their image pick-up devices, for helping them to record information. Due to reasons such as a shooting angle, a shot document may have a perspective transformation, so that information in the document image is hard to be read by human, and it is more difficult to be read by a computer. For this reason, perspective correction for the document image has attracted more attention.

Currently, there are some methods for correcting the captured document into a rectangle document. However, with these methods, an aspect ratio of an original document image cannot be recovered based on only one captured document image.

It is desired to provide a method and a device for correcting a document image captured by the image pick-up device conveniently.

SUMMARY

Additional aspects and/or advantages will be set forth in part in the description which follows and, in part, will be apparent from the description, or may be learned by practice of the embodiments.

A brief summary of the disclosure will be set forth hereinafter, so as to provide basic understanding of some aspects of the disclosure. It is to be understood that, this summary is not an exhaustive summary of the disclosure. It is neither intended to determine the critical or important part of the disclosure, nor intended to define the scope of the disclosure. It aims only to give some concepts in a simplified form, for serving as a preamble portion of the detailed description discussed latter.

It is the major object of the present disclosure to provide a method for correcting a document image captured by an image pick-up device. The method includes: determining world coordinates of four vertices of the document image; calculating an original aspect ratio of the document image based on a correspondence between the world coordinates of the four vertices and projective coordinates of the four vertices in a projective space, and an intrinsic matrix and characteristics of an extrinsic matrix of the image pick-up device; determining a projective transformation matrix based on the world coordinates of the four vertices and the aspect ratio; and obtaining a corrected document image based on the determined projective transformation matrix and the document image.

In an aspect of the present disclosure, it is provided a device for correcting a document image captured by an image pick-up device. The device includes a vertex coordinate determining unit, an aspect ratio calculating unit, a projective transformation matrix determining unit and a correcting unit. The vertex coordinate determining unit is configured to determine world coordinates of four vertices of the document image. The aspect ratio calculating unit is configured to calculate an original aspect ratio of the document image based on a correspondence between the world coordinates of the four vertices and projective coordinates of the four vertices in a projective space, and an intrinsic matrix and characteristics of an extrinsic matrix of the image pick-up device. The projective transformation matrix determining unit is configured to determine a projective transformation matrix based on the world coordinates of the four vertices and the aspect ratio. The correcting unit is configured to obtain a corrected document image based on the determined projective transformation matrix and the document image.

Further, it is provided a computer program for implementing the above method in an embodiment of the disclosure.

Further, it is provided a computer program product at least in a form of a computer readable medium, on which a computer program code for implementing the above method is recorded.

These and other advantages of the disclosure will be more apparent through the detailed description of the preferred embodiments of the disclosure given in conjunction with the drawings.

BRIEF DESCRIPTION OF THE DRAWINGS

The above and other objects, features and benefits of the disclosure will be understood more easily with reference to the description of the embodiments of the disclosure given in conjunction with the drawings. The components in the drawings are only for showing the principle of the disclosure. In the drawings, identical or similar technical features or components are represented by identical or similar numeral references.

DETAILED DESCRIPTION

Figure 1A:
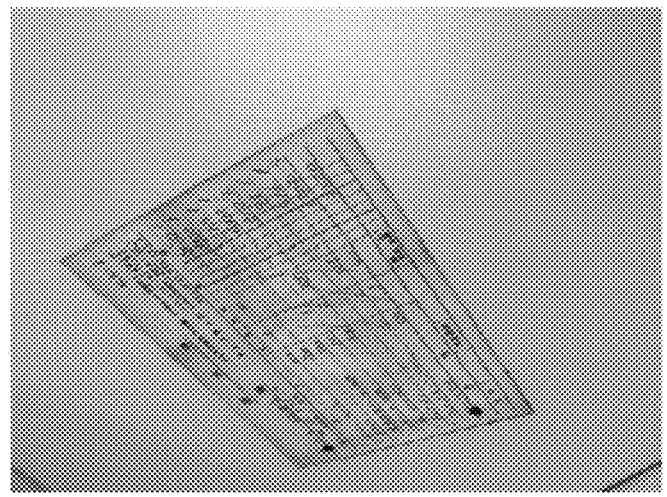
FIG. 1A shows a document image shot by an image pick-up device.

Reference will now be made in detail to the embodiments, examples of which are illustrated in the accompanying drawings, wherein like reference numerals refer to the like elements throughout. The embodiments are described below by referring to the figures.

Hereinafter, demonstrative embodiments of the disclosure will be described in conjunction with the drawings. For clearness and conciseness, not all the features of the practical embodiments are described in the specification. However, it is to be understood that, in development of any one of the practical embodiments, many decisions specific to the embodiment need be made, so as to achieve the specific object of the developer, such as in accordance with these limitations related to system and service, with these limitations varying with different embodiments. Moreover, it is to be understood that, although the developing work may be very complex and time-wasting, it is only a routine task for those skilled in the art benefiting from the disclosure.

Here, it is to be noted that, in the drawings, only device structures and/or process steps closely related to the solution of the disclosure are shown, and other details less related to the disclosure are omitted, in order to avoid the disclosure with unnecessary details.

It is provided a method for correcting perspective transformation based on only one captured image and recovering an original image based on an original aspect ratio in the disclosure.

Figure 1B:
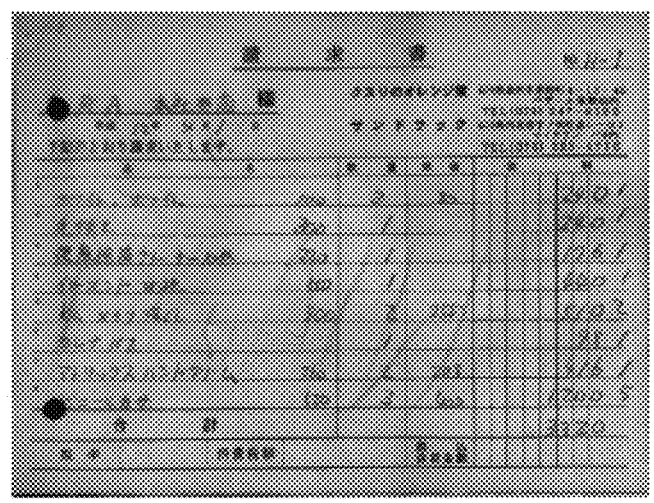
FIG. 1B shows a corrected document image.

In the method according to the present disclosure, an input is a shot image of rectangle or rectangular document (the rectangle document is in a same plane), which is a document image shot by an image pick-up device as shown in FIG. 1A. An output which can be obtained is the original aspect ratio of the document image and a corrected image. An image as shown in FIG. 1B can be obtained by correcting the document image in FIG. 1A by using the method according to the present disclosure.

The method and the device for correcting the document image captured by the image pick-up device according to the embodiments of the present invention are described in detail in conjunction with the drawings in the following. The description hereinafter is performed in the following order.

1. A method for correcting a document image captured by an image pick-up device
2. A device for correcting a document image captured by an image pick-up device
3. A computing device for implementing the method and the device according to the present disclosure

[1. A Method for Correcting a Document Image Captured by an Image Pick-Up Device]

Figure 2:
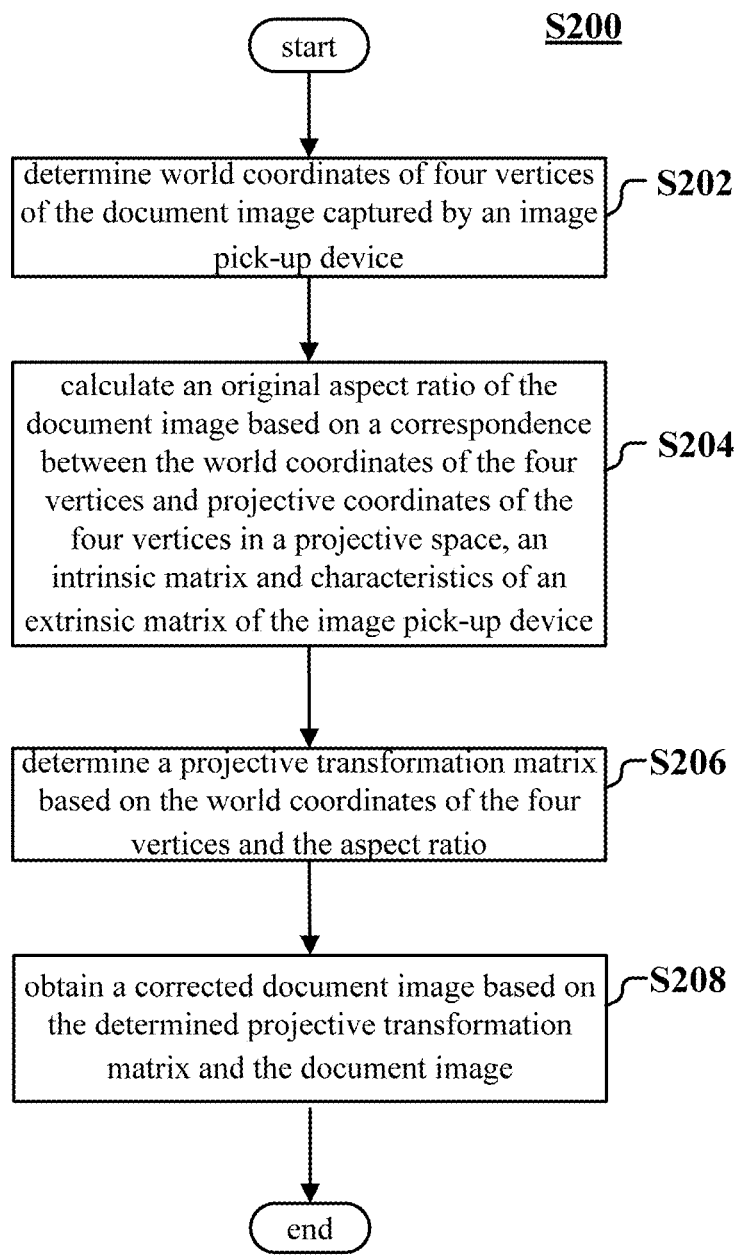
FIG. 2 shows a flowchart of an exemplary process of a method 200 for correcting a document image captured by an image pick-up device according to an embodiment of the present invention.

FIG. 2 shows a flowchart of an exemplary process of a method 200 for correcting a document image captured by an image pick-up device according to an embodiment of the present invention.

First, in step S202, positions (that are world coordinates) of four vertices of the document image captured by the image pick-up device in an image are determined.

Figure 3:
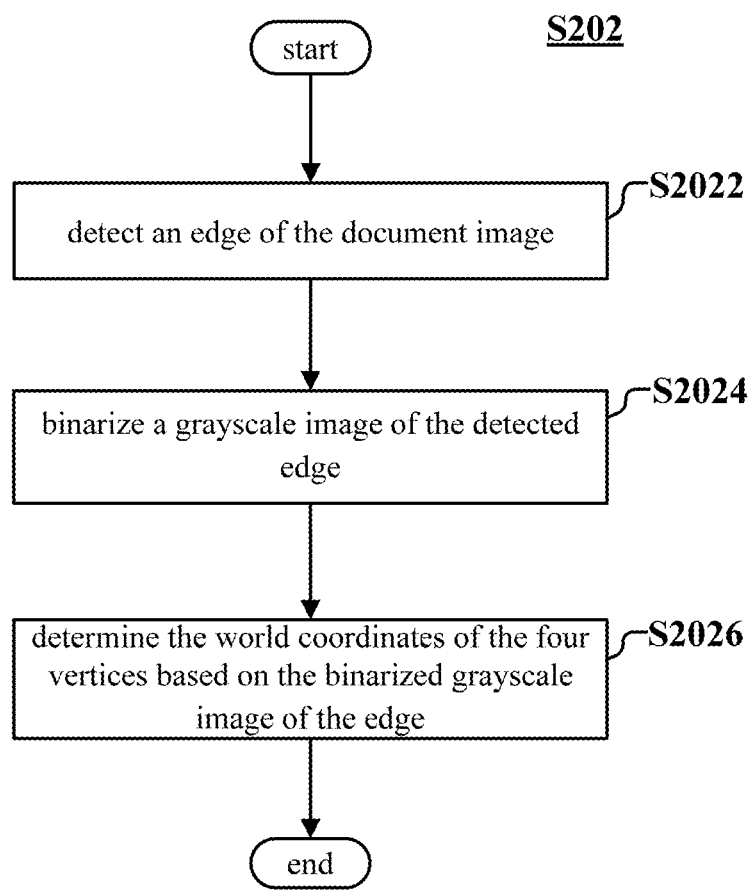
FIG. 3 is a flowchart showing an exemplary process of step S202 in FIG. 2.

FIG. 3 is a flowchart showing an exemplary process of step S202 (that is, positions of the four vertices of the document image captured by the image pick-up device in the image are determined) in FIG. 2.

As shown in FIG. 3, in step S2022, an edge of the document image is detected firstly. For example, detection may be performed by using the RGB gradient method. Next, in step S2024, the detected edge is binarized. At last, in step S2026, world coordinates of the four vertices are determined based on the binarized edge.

In the method according to the present disclosure, the world coordinates of the four vertices of the document image may also be inputted in advance as known parameters.

Next, in step S204, an original aspect ratio of the document image is calculated based on a correspondence between the world coordinates of the four vertices and projective coordinates of the four vertices in a projective space, and an intrinsic matrix and characteristics of an extrinsic matrix of the image pick-up device.

Figure 4A:
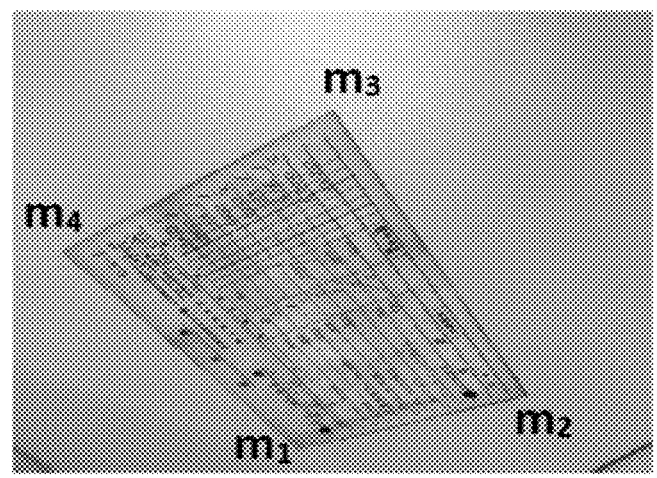
FIG. 4A shows coordinates of four vertices of a document image shot by an image pick-up device.

Specifically, FIG. 4A shows a document image shot by an image pick-up device, and four vertices of the document image are $m_1$, $m_2$, $m_3$ and $m_4$. Coordinates of the four vertices $m_i$ (i=1, 2, 3, 4) may be determined by using the above image processing method described in relation to step S202. It is assumed that any three points among $m_i$ are non-collinear.

Figure 4B:
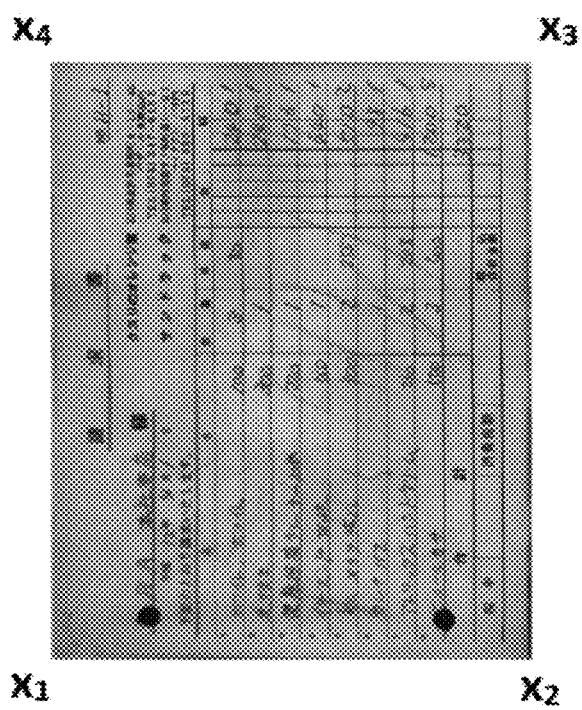
FIG. 4B shows coordinates of four vertices of an original document image.

A shape of an original document shown in FIG. 4B is rectangle. It is assumed that an aspect ratio of the original document is r, then coordinates of four vertices $x_i$ (i=1, 2, 3, 4) are $[0,0,1]^T$, $[1,0,1]^T$, $[1,r,1]^T$, and $[0,r,1]^T$, and the aspect ratio r is defined as $x_1x_4:x_1x_2$.

It is assumed that a projective transformation matrix from a plane $x_1x_2x_3x_4$ to a plane $m_1m_2m_3m_4$ is H, then $x_i$ and $m_i$ satisfy a relationship in formula (1) as follows:

$$Hx_i = \begin{cases} s_i m_i, & i = 1, 2, 3 \\ m_i, & i = 4 \end{cases} \quad (1)$$

where H is a 3×3 matrix, $x_i$ and $m_i$ (i=1, 2, 3, 4) are 3×1 vectors, and $s_i$ (i=1, 2, 3) is a real number coefficient.

The following formula can be obtained from the formula (1):

$$H[x_1 \quad x_2 \quad x_3] = [m_1 \quad m_2 \quad m_3]\begin{bmatrix} s_1 & & \\ & s_2 & \\ & & s_3 \end{bmatrix}.$$

The matrix $[x_1, x_2, x_3]$ is invertible in a case that the aspect ratio r of the original document is not 0, then $$H = [m_1 \quad m_2 \quad m_3]\begin{bmatrix} s_1 & & \\ & s_2 & \\ & & s_3 \end{bmatrix}[x_1 \quad x_2 \quad x_3]^{-1} \quad (2)$$

Then the following formula can be obtained by bringing the formula (2) into the formula (1):

$$\begin{bmatrix} s_1 & & \\ & s_2 & \\ & & s_3 \end{bmatrix}[x_1 \quad x_2 \quad x_3]^{-1} x_4 = [m_1 \quad m_2 \quad m_3]^{-1} m_4.$$

Since $$[x_1 \ x_2 \ x_3]^{-1}x_4 = \begin{bmatrix} 0 & 1 & 1 \\ 0 & 0 & r \\ 1 & 1 & 1 \end{bmatrix}^{-1} \begin{bmatrix} 0 \\ r \\ 1 \end{bmatrix} = \begin{bmatrix} 1 \\ -1 \\ 1 \end{bmatrix}, \quad (3)$$

then $$\begin{bmatrix} s_1 \\ -s_2 \\ s_3 \end{bmatrix} = [m_1 \ m_2 \ m_3]^{-1}m_4$$

Assuming that $H=[h_1 \ h_2 \ h_3]$, the following formula can be obtained from the formula (2):

$$H = [h_1 \ h_2 \ h_3] = [s_1m_1 \ s_2m_2 \ s_3m_3] \begin{bmatrix} -1 & 0 & 1 \\ 1 & -1/r & 0 \\ 0 & 1/r & 0 \end{bmatrix}.$$

Thus, following relationships can be obtained between $h_1$, $h_2$ and the aspect ratio r and the world coordinates $m_i$:

$$\begin{cases} h_1 = s_2m_2 - s_1m_1 \\ h_2 = 1/r(s_3m_3 - s_2m_2) \end{cases} \quad (4)$$

In the formula (4), only r is unknown in $h_1$ and $h_2$ since $m_i$ is known and $s_i$ can be calculated based on $m_i$.

In another aspect, from perspective of parameters of an image pick-up device, the projective transformation H satisfies $H=A \cdot R$, where A is an intrinsic matrix of the image pick-up device, and R is a rotation matrix (which is also referred as an extrinsic matrix) of the image pick-up device.

If i-th column of the rotation matrix R is represented by $r_i$, then $$H = A \cdot R = A \cdot [r_1 r_2 r_3 t] \quad (5)$$

Based on properties of an external parameter that $r_1^T \cdot r_2 = 0$ and $|r_1| = |r_2|$, the following formula (6) and formula (7) can be obtained.

$$h_1^T A^{-T} A^{-1} h_2 = 0 \quad (6)$$

$$h_1^T A^{-T} A^{-1} h_1 = h_2^T A^{-T} A^{-1} h_2 \quad (7)$$

The aspect ratio r of the document can be obtained according to the formula (4) and the formula (7) in a case that the internal matrix A is known.

The internal matrix A of the image pick-up device is $$\begin{bmatrix} f_x & & x_0 \\ & f_y & y_0 \\ & & 1 \end{bmatrix}.$$

where $f_x$ is a focal length of the image pick-up device on a horizontal axis in pixels, $f_y$ is a focal length of the image pick-up device on a vertical axis in pixels, and $(x_0, y_0)$ is a coordinate of a principle point. According to EXIF (exchangeable image file) information, in a case that the focal length of the image pick-up device is f, a resolution is w×h and a size of a sensor is a×b, then the intrinsic matrix A is:

$$\begin{bmatrix} f \cdot w/a & & w/2 \\ & f \cdot h/b & h/2 \\ & & 1 \end{bmatrix}.$$

Then assuming that $h_1 = (h_{11}, h_{21}, h_{31})^T$ and $h_2 = 1/r(h_{12}, h_{22}, h_{32})^T$, the following formula can be obtained from the formula (7):

$$r^2 = \frac{\left(\frac{2h_{12}}{w} - h_{32}\right)^2 \cdot \left(\frac{a}{f}\right)^2 \cdot \frac{1}{4} + \left(\frac{2h_{22}}{w} - h_{32}\right)^2 \cdot \left(\frac{b}{f}\right)^2 \cdot \frac{1}{4} + h_{32}^2}{\left(\frac{2h_{11}}{w} - h_{31}\right)^2 \cdot \left(\frac{a}{f}\right)^2 \cdot \frac{1}{4}\left(\frac{2h_{21}}{w} - h_{31}\right)^2 \cdot \left(\frac{b}{f}\right)^2 \cdot \frac{1}{4} + h_{31}^2}.$$

In this way, the original aspect r is calculated.

Next, in step S206, the projective transformation matrix is determined based on the world coordinates of the four vertices and the aspect ratio.

$$H = [h_1 \ h_2 \ h_3] = [s_1m_1 \ s_2m_2 \ s_3m_3] \begin{bmatrix} -1 & 0 & 1 \\ 1 & -1/r & 0 \\ 0 & 1/r & 0 \end{bmatrix}.$$

At last, in step S208, a corrected document image may be obtained based on the determined projective transformation matrix and the captured document image.

The method according to the present disclosure has the following special scenarios when being applied to a case of shooting an image by using a camera module.

Some mobile phones have square modes. For example, a resolution of a normal image is 3264×2448 and a resolution of an image shot in the square mode is 2448×2448, that is, the original image is cut. In a case that the method according to the present disclosure is applied to the image shot in the square mode, it is only required to input a resolution of an image before being cut, that is, w=3264 and h=2448.

In addition, for an image shot in a zooming mode, a digital zooming of the mobile phone can be read from the EXIF, and a focal length f after zooming is obtained by multiplying an original focal length $f_{original}$ by the digital zooming.

In the method according to the present disclosure, the aspect ratio of the original document can be recovered based on a geographic space and an arithmetic property of the image pick-up device. With the method according to the present disclosure, the document image can be corrected with only one image being captured, which is convenient for users.

[2. A Device for Correcting a Document Image Captured by an Image Pick-Up Device]

Figure 5:
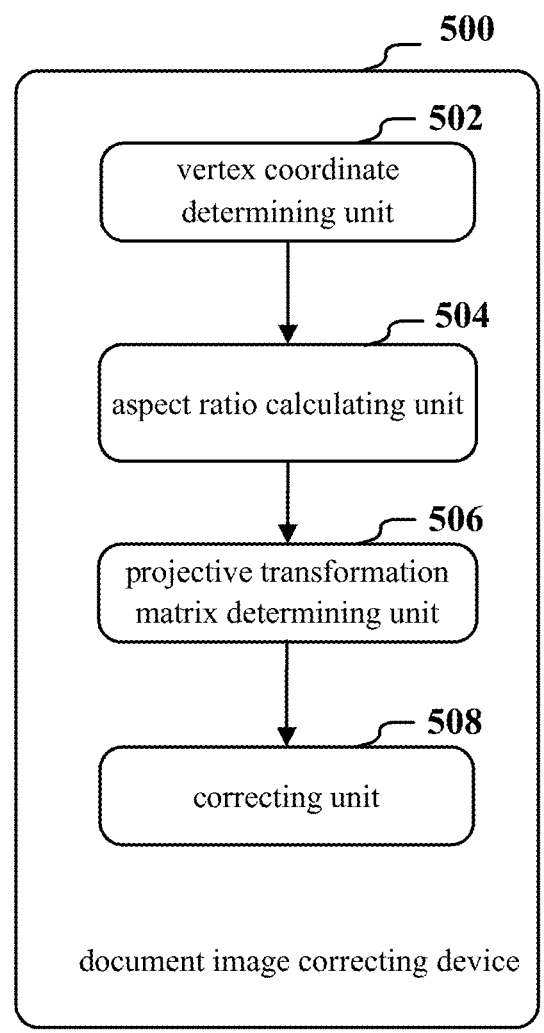
FIG. 5 is a block diagram showing an exemplary configuration of a device 500 for correcting a document image captured by an image pick-up device according to an embodiment of the present invention.

FIG. 5 is a block diagram showing an exemplary configuration of a device 500 for correcting a document image captured by an image pick-up device according to an embodiment of the present invention.

As shown in FIG. 5, the device 500 for correcting the document image captured by the image pick-up device includes a vertex coordinate determining unit 502, an aspect ratio calculating unit 504, a projective transformation matrix determining unit 506 and a correcting unit 508.

The vertex coordinate determining unit 502 is configured to determine world coordinates of four vertices of the document image.

The aspect ratio calculating unit 504 is configured to calculate an original aspect ratio of the document image based on a correspondence between world coordinates of the four vertices and projective coordinates of the four vertices in a projective space, and an intrinsic matrix and characteristics of an extrinsic matrix of the image pick-up device.

The projective transformation matrix determining unit 506 is configured to determine a projective transformation matrix based on the world coordinates of the four vertices and the aspect ratio.

The correcting unit 508 is configured to obtain a corrected document image based on the determined projective transformation matrix and the document image.

Figure 6:
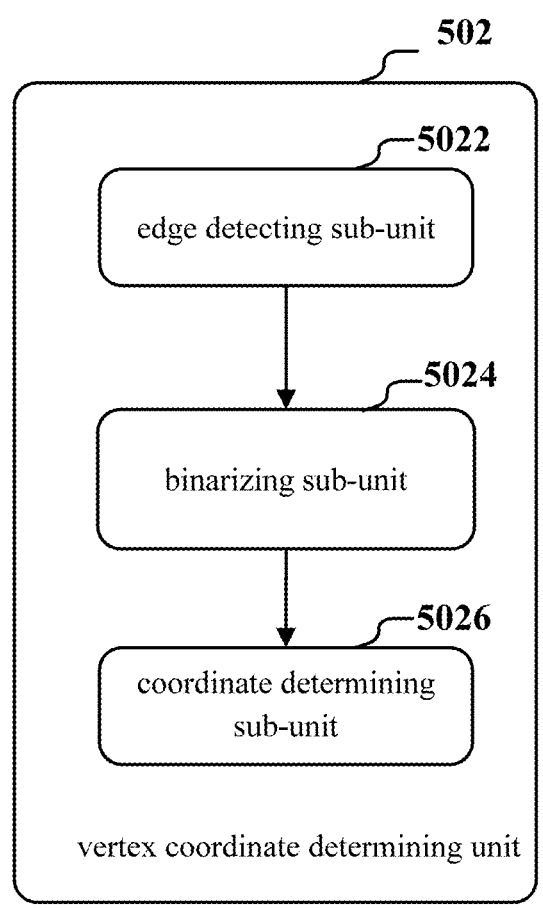
FIG. 6 is a block diagram of an exemplary configuration of a vertex coordinate determining unit 502 in FIG. 5.

FIG. 6 is a block diagram of an exemplary configuration of a vertex coordinate determining unit 502 in FIG. 5. The vertex coordinate determining unit 502 includes an edge detecting sub-unit 5022, a binarizing sub-unit 5024 and a coordinate determining sub-unit 5026.

The edge detecting sub-unit 5022 is configured to detect an edge of the document image.

The binarizing sub-unit 5024 is configured to binarize the detected edge.

The coordinate determining sub-unit 5026 is configured to determine the world coordinates of the four vertices based on the binarized edge.

The projective transformation matrix H satisfies:

$$Hx_i = \begin{cases} s_i m_i, & i = 1, 2, 3 \\ m_i, & i = 4 \end{cases},$$

where H is a 3×3 matrix, $m_i$ and $x_i$ are 3×1 vectors, $m_i$ is a world coordinate of each of the four vertices, $x_i$ is a projective coordinate of each of the four vertices in the projective space, and $s_i$ is a real number coefficient depending on $m_i$.

Assuming that the projective transformation matrix is H=[$h_1$ $h_2$ $h_3$], then relationships between $h_1$, $h_2$ and the aspect ratio r and the world coordinates $m_i$ are:

$$\begin{cases} h_1 = s_2 m_2 - s_1 m_1 \\ h_2 = 1/r(s_3 m_3 - s_2 m_2) \end{cases}.$$

The intrinsic matrix A of the image pick-up device is:

$$A = \begin{bmatrix} f \cdot w/a & & w/2 \\ & f \cdot h/b & h/2 \\ & & 1 \end{bmatrix},$$

where f is a focal length of the image pick-up device, w and h are resolutions, and a and b are sizes of a sensor.

The characteristic of the extrinsic matrix of the image pick-up device is as follows: $r_1^T \cdot r_2 = 0$ and $|r_1| = |r_2|$, if the extrinsic matrix is represented as R=[$r_1$ $r_2$ $r_3$t].

A relationship between $h_1$, $h_2$ and the intrinsic matrix A is obtained as follows based on the intrinsic matrix A of the image pick-up device and the characteristics of the extrinsic matrix of the image pick-up device:

$$h_1^T A^{-T} A^{-1} h_1 = h_2^T A^{-T} A^{-1} h_2.$$

The aspect ratio r is determined based on the relationships between $h_1$, $h_2$ and the aspect ratio r and the world coordinates $m_i$ and the relationship between $h_1$, $h_2$ and the intrinsic matrix A.

The projective transformation matrix H is determined as follows based on the world coordinates of the four vertices and the aspect ratio:

$$H = [h_1 \ h_2 \ h_3]$$
$$= [s_1 m_1 \ s_2 m_2 \ s_3 m_3] \begin{bmatrix} -1 & 0 & 1 \\ 1 & -1/r & 0 \\ 0 & 1/r & 0 \end{bmatrix}$$

$$H = [h_1 \ h_2 \ h_3]$$
$$= [s_1 m_1 \ s_2 m_2 \ s_3 m_3] \begin{bmatrix} -1 & 0 & 1 \\ 1 & -1/r & 0 \\ 0 & 1/r & 0 \end{bmatrix}.$$

For details of operation and functions of each part of the device 500 for correcting the document image captured by the image pick-up device, reference may be made to the embodiments of the method according to the present disclosure for correcting the document image captured by the image pick-up device described in conjunction with FIGS. 1 to 4, which are not described in detail.

It should be noted here that, the devices as shown in FIGS. 5 and 6 and structures of components of the devices are merely exemplary, and the structural block diagram as shown in FIGS. 5 and 6 can be modified by those skilled in the art if required.

A method and a device for correcting a document image captured by an image pick-up device are provided in the present disclosure. Compared with the conventional method, the present method has the following advantages.

1. The aspect ratio of the original document can be recovered based on a geographic space and an arithmetic properties of the image pick-up device, which cannot be achieved by using the existing method such as Office lens;
2. The document image can be corrected with only one image being captured, which is very convenient for users.

[3. A Computing Device for Implementing the Method and the Device According to the Present Disclosure]

The basic principle of the disclosure has been described above in conjunction with specific embodiments. However, it is to be noted that, it is to be understood by those skilled in the art that, all or any step or component of the method and apparatus of the disclosure may be implemented in hardware, firmware, software or a combination thereof in any computing apparatus (including a processor, a storage medium and the like) or a network of computing apparatus, which is implementable by those skilled in the art using their basic programming skill upon reading the description of the disclosure.

Thus, the objects of the disclosure may be implemented by a program or a group of programs running on any computing apparatus. The computing apparatus may be a well-known common apparatus. Thus, the objects of the disclosure may also be implemented by providing a program product containing program code for implementing the method or apparatus. That is to say, such program product is also a part of the disclosure, and so does the storage medium in which such program product is stored. Apparently, the storage medium may be any well-known storage medium or any storage medium that will be developed in the future.

Figure 7:
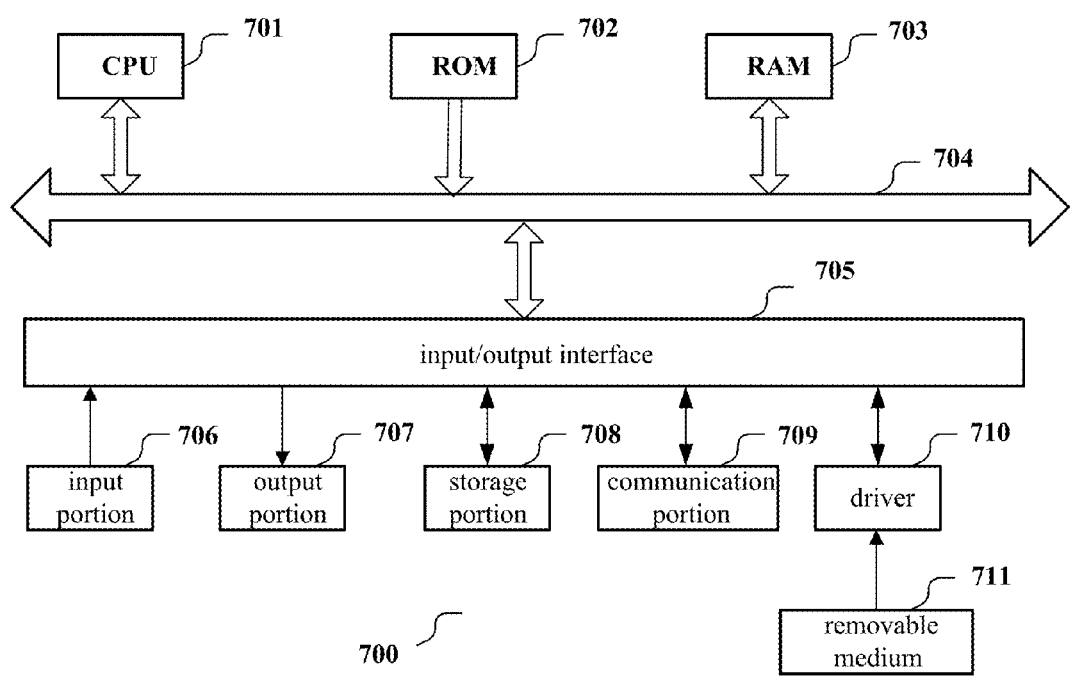
FIG. 7 is an exemplary structural diagram of a computing device for implementing the method and the device for correcting a document image captured by an image pick-up device according to the present disclosure.

In a case that the embodiment of the disclosure is implemented in software and/or firmware, programs composing this software are mounted onto a computer having a dedicated hardware structure, such as the general purpose computer 700 as shown in FIG. 7, from a storage medium or a network. The computer, when being mounted with various programs, is capable of performing various functions and the like.

In FIG. 7, a computer including a central processing unit (CPU) 701 performs various processes based on a program stored in a read-only memory (ROM) 702 or a program loaded onto a random access memory (RAM) 703 from a storage portion 708. In the RAM 703, data required by the CPU 701 in performing various processes and the like are stored as required. The CPU 701, the ROM 702 and the RAM 703 are linked to each other via a bus 704. An input/output interface 705 is also linked to the bus 704.

Linked to the input/output interface 705 are: an input portion 706 (including the keyboard, the mouse and the like), an output portion 707 (including a display, such as a cathode ray tube (CRT) and a liquid crystal display (LCD), a speaker and the like), the storage portion 708 (including a hard disk and the like) and a communication portion 709 (including a network interface card, such as an LAN card and a modem). The communication portion 709 performs communication processes via a network, such as Internet. A driver 710 may also be linked to the input/output interface 705 as required. A removable medium 711, such as a magnetic disk, an optical disk, a magneto-optical disk and a semiconductor memory, may be mounted on the driver 710 as required, so that the computer program that is read out from the removable medium 711 is mounted onto the storage portion 708.

In a case that the embodiment of the disclosure is implemented in software, programs composing this software are mounted or accessible from a network, such as Internet, or from a storage medium, such as the removable medium 711.

It is to be understood by those skilled in the art that, the storage medium is not limited to the removable medium 711 shown in FIG. 7 in which the program is stored and which is distributed separately from the device to provide the user with the program. Examples of the removable medium 711, which can be a non-transitory storage medium, include a magnetic disk (including a soft disk (registered trademark)), an optical disk (including a compact disk read only memory (CD-ROM) and a digital video disk (DVD)), a magneto-optical disk (including a mini disk (MD) (registered trademark)) and a semiconductor memory. Alternatively, the storage medium may be a hard disk contained in the ROM 702 or the storage portion 708 and the like, in which a program is stored and which is distributed to the user together with the device containing the same.

It is further proposed a program product having machine readable instruction codes stored therein in the disclosure. The instruction codes, when being read out and executed by the machine, performs the above method according to the embodiment of the disclosure.

Accordingly, the storage medium carrying the above program product having machine readable instruction codes stored therein is included in the disclosure. The storage medium includes but is not limited to a soft disk, an optical disk, a magneto-optical disk, a storage card, a storage stick and the like.

It is to be understood by those ordinal skilled in the art that, the listed are exemplary embodiments, and the disclosure is not limited thereto.

In the specification, the expressions such as "a first", "a second" and "a n-th" is meant to distinguish the described features literally, so as to describe the disclosure clearly. Thus, these expressions should not be considered as limitation.

As an example, various steps of the above method and various integral modules and/or units of the above apparatus may be implemented as software, firmware, hardware or a combination thereof, and may be used as a part of a corresponding apparatus. The various integral modules and units of the above apparatus, when being configured in a form of software, firmware, hardware or a combination thereof, may be implemented in a means or manner well-known to those skilled in the art, which is not described in detail here.

As an example, in a case of software or firmware, programs composing this software are mounted onto a computer having a dedicated hardware structure (such as the general purpose computer 700 as shown in FIG. 7) from a storage medium or a network. The computer, when being mounted with various programs, is capable of performing various functions and the like.

The feature described and/or illustrated for one embodiment in the above description of the specific embodiment of the disclosure may be applied in one or more other embodiment in a same or similar manner, may be combined with the feature in other embodiment, or may be used to replace the feature in other embodiment.

It is to be emphasized that, term "include/comprise" used herein refers to the presence of a feature, an element, a step or an assembly, but not excludes the presence or addition of other features, elements, steps or assemblies.

Further, the method according to the disclosure is not limited to be performed in the chronological order described in the specification, and may also be performed sequentially, in parallel or separately. Thus, the order described herein in which the method is performed is not meant to limit the technical scope of the disclosure.

The disclosure and the advantages thereof have been described above. It is to be understood that, various variations, alternations and transformations may be made without deviating from the spirit and scope of the disclosure defined in the appended claims. The scope of the disclosure is not limited to the specific embodiment of the process, device, means, method and step described in the specification. It can be understood by those ordinary skilled in the art from the disclosure that, the process, device, means, method and step that exist or to be developed in the future and perform functions substantially the same and obtain substantially the same result as the corresponding embodiment herein can be used. Thus, the appended claim aims to include such process, device, means, method and step in their scope.

It can be seen from the above illustration that, at least the following technical solutions are disclosed.

Appendix 1. A method for correcting a document image captured by an image pick-up device, comprising:
determining world coordinates of four vertices of the document image;
calculating an original aspect ratio of the document image based on a correspondence between the world coordinates of the four vertices and projective coordinates of the four vertices in a projective space, an intrinsic matrix and characteristics of an extrinsic matrix of the image pick-up device;
determining a projective transformation matrix based on the world coordinates of the four vertices and the aspect ratio; and obtaining a corrected document image based on the determined projective transformation matrix and the document image.

Appendix 2. The method according to appendix 1, wherein the determining world coordinates of four vertices of the document image comprises:

detecting an edge of the document image;

binarizing a grayscale image of the detected edge; and determining the world coordinates of the four vertices based on the binarized grayscale image of the edge.

Appendix 3. The method according to appendix 1, wherein the projective transformation matrix H satisfies:

$$Hx_i = \begin{cases} s_i m_i, i = 1, 2, 3 \\ m_i, i = 4 \end{cases},$$

where H is a 3×3 matrix, $m_i$ and $x_i$ are 3×1 vectors, $m_i$ is a world coordinate of each of the four vertices, $x_i$ is a projective coordinate of each of the four vertices in the projective space, and $s_i$ is a real number coefficient depending on $m_i$.

Appendix 4. The method according to appendix 3, wherein when the projective transformation matrix is H=[$h_1$ $h_2$ $h_3$], relationships between $h_1$, $h_2$ and the aspect ratio r and the world coordinate $m_i$ are:

$$\begin{cases} h_1 = s_2 m_2 - s_1 m_1 \\ h_2 = 1/r(s_3 m_3 - s_2 m_2) \end{cases}.$$

Appendix 5. The method according to appendix 4, wherein the intrinsic matrix A of the image pick-up device is:

$$A = \begin{bmatrix} f \cdot w/a & & w/2 \\ & f \cdot h/b & h/2 \\ & & 1 \end{bmatrix},$$

where f is a focal length of the image pick-up device, w and h are resolutions, and a and b are sizes of a sensor.

Appendix 6. The method according to appendix 5, wherein the characteristic of the extrinsic matrix of the image pick-up device is: $r_1^T \cdot r_2 = 0$ and $|r_1|=|r_2|$ in a case that the extrinsic matrix is represented as R=[$r_1$ $r_2$ $r_3$ t].

Appendix 7. The method according to appendix 6, wherein a relationship between $h_1$, $h_2$ and the intrinsic matrix A is obtained as follows based on the intrinsic matrix A of the image pick-up device and the characteristics of the extrinsic matrix of the image pick-up device:

$$h_1^T A^{-T} A^{-1} h_1 = h_2^T A^{-T} A^{-1} h_2.$$

Appendix 8. The method according to appendix 7, wherein the aspect ratio r is determined based on the relationships between $h_1$, $h_2$ and the aspect ratio r and the world coordinates $m_i$ and the relationship between $h_1$, $h_2$ and the intrinsic matrix A.

Appendix 9. The method according to appendix 8, wherein the projective transformation matrix H is determined as follows based on the world coordinates of the four vertices and the aspect ratio:

$$H = [h_1 \; h_2 \; h_3]$$
$$= [s_1 m_1 \; s_2 m_2 \; s_3 m_3] \begin{bmatrix} -1 & 0 & 1 \\ 1 & -1/r & 0 \\ 0 & 1/r & 0 \end{bmatrix}$$

$$H = [h_1 \; h_2 \; h_3]$$
$$= [s_1 m_1 \; s_2 m_2 \; s_3 m_3] \begin{bmatrix} -1 & 0 & 1 \\ 1 & -1/r & 0 \\ 0 & 1/r & 0 \end{bmatrix}.$$

Appendix 10. A device for correcting a document image captured by an image pick-up device, comprising:

a vertex coordinate determining unit configured to determine world coordinates of four vertices of the document image;

an aspect ratio calculating unit configured to calculate an original aspect ratio of the document image based on a correspondence between the world coordinates of the four vertices and projective coordinates of the four vertices in a projective space, an intrinsic matrix and characteristics of an extrinsic matrix of the image pick-up device;

a projective transformation matrix determining unit configured to determine a projective transformation matrix based on the world coordinates of the four vertices and the aspect ratio; and a correcting unit configured to obtain a corrected document image based on the determined projective transformation matrix and the document image.

Appendix 11 The device according to appendix 10, wherein the vertex coordinate determining unit comprises:

an edge detecting sub-unit configured to detect an edge of the document image;

a binarizing sub-unit configured to binarize a grayscale image of the detected edge; and a coordinate determining sub-unit configured to determine the world coordinates of the four vertices based on the binarized grayscale image of the edge.

Appendix 12 The device according to appendix 10, wherein the projective transformation matrix H satisfies:

$$Hx_i = \begin{cases} s_i m_i, i = 1, 2, 3 \\ m_i, i = 4 \end{cases},$$

where H is a 3×3 matrix, $m_i$ and $x_i$ are 3×1 vectors, $m_i$ is a world coordinate of each of the four vertices, $x_i$ is a projective coordinate of each of the four vertices in the projective space, and $s_i$ is a real number coefficient depending on $m_i$.

Appendix 13 The device according to appendix 12, wherein in case of the projective transformation matrix is H=[$h_1$ $h_2$ $h_3$], then relationships between $h_1$, $h_2$ and the aspect ratio r and the world coordinate $m_i$ are:

$$\begin{cases} h_1 = s_2 m_2 - s_1 m_1 \\ h_2 = 1/r(s_3 m_3 - s_2 m_2) \end{cases}.$$

Appendix 14 The device according to appendix 13, wherein the intrinsic matrix A of the image pick-up device is:

$$A = \begin{bmatrix} f \cdot w/a & & w/2 \\ & f \cdot h/b & h/2 \\ & & 1 \end{bmatrix},$$

where f is a focal length of the image pick-up device, w and h are resolutions, and a and b are sizes of a sensor.

Appendix 15 The device according to appendix 14, wherein the characteristic of the extrinsic matrix of the image pick-up device is: $r_1^T \cdot r2=0$ and $|r_1|=|r_2|$ in a case that the extrinsic matrix is represented as R=[$r_1$ $r_2$ $r_3$ t].

Appendix 16 The device according to appendix 15, wherein a relationship between $h_1$, $h_2$ and the intrinsic matrix A is obtained as follows based on the intrinsic matrix A of the image pick-up device and the characteristics of the extrinsic matrix of the image pick-up device:

$$h_1^T A^{-T} A^{-1} h_1 = h_2^T A^{-T} A^{-1} h_2.$$

Appendix 17 The device according to appendix 16, wherein the aspect ratio r is determined based on the relationships between $h_1$, $h_2$ and the aspect ratio r and the world coordinates $m_i$ and the relationship between $h_1$, $h_2$ and the intrinsic matrix A.

Appendix 18 The device according to appendix 17, wherein the projective transformation matrix H is determined as follows based on the world coordinates of the four vertices and the aspect ratio:

$$H = [h_1 \quad h_2 \quad h_3]$$
$$= [s_1 m_1 \quad s_2 m_2 \quad s_3 m_3] \begin{bmatrix} -1 & 0 & 1 \\ 1 & -1/r & 0 \\ 0 & 1/r & 0 \end{bmatrix}$$

$$H = [h_1 \quad h_2 \quad h_3]$$
$$= [s_1 m_1 \quad s_2 m_2 \quad s_3 m_3] \begin{bmatrix} -1 & 0 & 1 \\ 1 & -1/r & 0 \\ 0 & 1/r & 0 \end{bmatrix}.$$

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A method for correcting a document image captured by an image pick-up device based on a geographic space and arithmetic properties of the image pick-up device, comprising:
   determining world coordinates of four vertices of the document image;
   calculating an original aspect ratio of the document image based on a correspondence between the world coordinates of the four vertices and projective coordinates of the four vertices in a projective space, an intrinsic matrix and characteristics of an extrinsic matrix of the image pick-up device;
   determining a projective transformation matrix based on the world coordinates of the four vertices and the aspect ratio; and
   obtaining a corrected document image being readable by a computer based on the determined projective transformation matrix and the document image;

wherein the intrinsic matrix is formed by using a focal length of the image pick-up device, resolutions and sizes of a sensor.

2. The method according to claim 1, wherein the determining world coordinates of four vertices of the document image comprises:
   detecting an edge of the document image;
   binarizing a grayscale image of the edge; and
   determining the world coordinates of the four vertices based on the grayscale image of the edge.

3. The method according to claim 1, wherein projective transformation matrix H satisfies:

$$Hx_i = \begin{cases} s_i m_i, & i = 1, 2, 3 \\ m_i, & i = 4 \end{cases},$$

where H is a 3×3 matrix, $m_i$, and $x_i$, are 3×1 vectors, $m_i$, is a world coordinate of each of the four vertices, $x_i$, is a projective coordinate of each of the four vertices in the projective space, and $s_i$, is a real number coefficient depending on $m_i$.

4. The method according to claim 3, wherein when the projective transformation matrix is H=[$h_1$ $h_2$ $h_3$], relationships between $h_1$, $h_2$ and aspect ratio r and world coordinate $m_i$, are:

$$\begin{cases} h_1 = s_2 m_2 - s_1 m_1 \\ h_2 = 1/r(s_3 m_3 - s_2 m_2) \end{cases}.$$

5. The method according to claim 4, wherein intrinsic matrix A of the image pick-up device is:

$$A = \begin{bmatrix} f \cdot w/a & & w/2 \\ & f \cdot h/b & h/2 \\ & & 1 \end{bmatrix},$$

where f is a focal length of the image pick-up device, w and h are resolutions, and a and b are sizes of a sensor.

6. The method according to claim 5, wherein the characteristics of the extrinsic matrix of the image pick-up device is: $r_1^T \cdot r_2=0$ and $|r_1|=|r_2|$ when the extrinsic matrix is represented as R=[$r_1$ $r_2$ $r_3$ t].

7. The method according to claim 6, wherein a relationship between $h_1$, $h_2$ and intrinsic matrix A is obtained based on intrinsic matrix A of the image pick-up device and the characteristics of the extrinsic matrix of the image pick-up device:

$$h_1^T A^{-T} A^{-1} h_1 = h_2^T A^{-T} A^{-1} h_2.$$

8. The method according to claim 7, wherein aspect ratio r is determined based on relationships between $h_1$, $h_2$ and aspect ratio r and the world coordinates $m_i$, and a relationship between $h_1$, $h_2$ and intrinsic matrix A.

9. The method according to claim 8, wherein projective transformation matrix H is determined based on the world coordinates of the four vertices and the aspect ratio:

$$H = [h_1 \quad h_2 \quad h_3]$$
$$= [s_1 m_1 \quad s_2 m_2 \quad s_3 m_3] \begin{bmatrix} -1 & 0 & 1 \\ 1 & -1/r & 0 \\ 0 & 1/r & 0 \end{bmatrix}$$

-continued $$H = [\begin{array}{ccc} h_1 & h_2 & h_3 \end{array}]$$
$$= [\begin{array}{ccc} s_1 m_1 & s_2 m_2 & s_3 m_3 \end{array}] \begin{bmatrix} -1 & 0 & 1 \\ 1 & -1/r & 0 \\ 0 & 1/r & 0 \end{bmatrix}.$$

10. A non-transitory computer readable storage medium storing codes which can be executed on information processing equipment to implement a method according to claim 1.

11. A device for correcting a document image captured by an image pick-up device based on a geographic space and arithmetic properties of the image pick-up device, comprising:
   a vertex coordinate determining unit configured to determine world coordinates of four vertices of the document image;
   an aspect ratio calculating unit configured to calculate an original aspect ratio of the document image based on a correspondence between the world coordinates of the four vertices and projective coordinates of the four vertices in a projective space, an intrinsic matrix and characteristics of an extrinsic matrix of the image pick-up device;
   a projective transformation matrix determining unit configured to determine a projective transformation matrix based on the world coordinates of the four vertices and the aspect ratio; and
   a correcting unit configured to obtain a corrected document image being readable by a computer based on the projective transformation matrix and the document image;
   wherein the intrinsic matrix is formed by using a focal length of the image pick-up device, resolutions and sizes of a sensor.

12. The device according to claim 11, wherein the vertex coordinate determining unit comprises:
   an edge detecting sub-unit configured to detect an edge of the document image;
   a binarizing sub-unit configured to binarize a grayscale image of the detected edge; and
   a coordinate determining sub-unit configured to determine the world coordinates of the four vertices based on the grayscale image of the edge.

13. The device according to claim 11, wherein projective transformation matrix H satisfies:

$$Hx_i = \begin{cases} s_i m_i, & i = 1, 2, 3 \\ m_i, & i = 4 \end{cases},$$

where H is a 3×3 matrix, $m_i$, and $x_i$, are 3×1 vectors, $m_i$, is a world coordinate of each of the four vertices, $x_i$, is a projective coordinate of each of the four vertices in the projective space, and $s_i$, is a real number coefficient depending on $m_i$.

14. The device according to claim 13, wherein when the projective transformation matrix is H=[$h_1$ $h_2$ $h_3$], relationships between $h_1$, $h_2$ and the aspect ratio r and the world coordinate $m_i$, are:

$$\begin{cases} h_1 = s_2 m_2 - s_1 m_1 \\ h_2 = 1/r(s_3 m_3 - s_2 m_2) \end{cases}.$$

15. The device according to claim 14, wherein intrinsic matrix A of the image pick-up device is:

$$A = \begin{bmatrix} f \cdot w/a & & w/2 \\ & f \cdot h/b & h/2 \\ & & 1 \end{bmatrix},$$

where f is a focal length of the image pick-up device, w and h are resolutions, and a and b are sizes of a sensor.

16. The device according to claim 15, wherein the characteristics of the extrinsic matrix of the image pick-up device is: $r_1^T \cdot r_2 = 0$ and $|r_1| = |r_2|$ when the extrinsic matrix is represented as R=[$r_1$ $r_2$ $r_3$ t].

17. The device according to claim 16, wherein a relationship between $h_1$, $h_2$ and intrinsic matrix A is obtained based on intrinsic matrix A of the image pick-up device and the characteristics of the extrinsic matrix of the image pick-up device:

$$h_1^T A^{-T} A^{-1} h_1 = h_2^T A^{-T} A^{-1} h_2.$$

18. The device according to claim 17, wherein aspect ratio r is determined based on relationships between $h_1$, $h_2$ and aspect ratio r and the world coordinates $m_i$, and the relationship between $h_1$, $h_2$ and intrinsic matrix A.

19. The device according to claim 18, wherein projective transformation matrix H is determined based on the world coordinates of the four vertices and the aspect ratio:

$$H = [\begin{array}{ccc} h_1 & h_2 & h_3 \end{array}]$$
$$= [\begin{array}{ccc} s_1 m_1 & s_2 m_2 & s_3 m_3 \end{array}] \begin{bmatrix} -1 & 0 & 1 \\ 1 & -1/r & 0 \\ 0 & 1/r & 0 \end{bmatrix}$$

$$H = [\begin{array}{ccc} h_1 & h_2 & h_3 \end{array}]$$
$$= [\begin{array}{ccc} s_1 m_1 & s_2 m_2 & s_3 m_3 \end{array}] \begin{bmatrix} -1 & 0 & 1 \\ 1 & -1/r & 0 \\ 0 & 1/r & 0 \end{bmatrix}.$$

20. A system for correcting a document image captured by an image pick-up device based on a geographic space and arithmetic properties of the image pick-up device, comprising:
   a memory storing codes; and
   a processor, the processor being capable of executing the codes to:
     determine world coordinates of four vertices of the document image;
     calculate an original aspect ratio of the document image based on a correspondence between the world coordinates of the four vertices and projective coordinates of the four vertices in a projective space, an intrinsic matrix and characteristics of an extrinsic matrix of the image pick-up device;
     determine a projective transformation matrix based on the world coordinates of the four vertices and the aspect ratio; and
   obtain a corrected document image being readable by a computer based on the determined projective transformation matrix and the document image;
   wherein the intrinsic matrix is formed by using a focal length of the image pick-up device, resolutions and sizes of a sensor.

* * * * *